May 15, 1956   J. E. WILHELM   2,745,603
BOILER CONTROL SYSTEM
Filed March 29, 1952

INVENTOR.
JACK E. WILHELM
BY
Raymond W. Junkins
ATTORNEY

United States Patent Office 2,745,603
Patented May 15, 1956

2,745,603

BOILER CONTROL SYSTEM

Jack E. Wilhelm, Pittsburgh, Pa., assignor to Bailey Meter Company, a corporation of Delaware Application March 29, 1952, Serial No. 279,490

4 Claims. (Cl. 236—26)

This invention relates to control systems for establishing, or maintaining substantially constant, any desired electrical, thermal, chemical, physical or other variable condition through the control of a corrective agent, or agents. More particularly, my invention relates to control systems wherein a fluid pressure is utilized as the motive power for actuating devices to control the application of corrective agents in accordance with a variable condition.

It is an object of this invention to provide a control system wherein a condition is maintained by a plurality of units which respond to changes in the condition in such a manner as to restore the condition to a predetermined value.

It is a further object of this invention to provide means to transmit the position of a controlling means so that the main impulse from the condition detecting means is balanced against the position transmitted impulse and the resultant impulse readjusts the controller means to maintain the condition at a new value.

It is also an object of this invention to provide a control system wherein a condition being substantially maintained by a plurality of units, will be maintained upon failure of one or more of the units. An embodiment of this invention, can be shown in control for a pulverized fuel-fired vapor generator. The pressure of the vapor from the generator is dependent upon the rate of fuel being burned and the amount of vapor demanded from the generator at a particular time. If the demand upon the vapor generator is substantially constant, and the pressure is being maintained by the firing of a plurality of pulverizers—the failure of one of the pulverizers will cause a drop in the pressure. The remaining pulverizers should then be adjusted to fire at a rate sufficient to maintain the pressure. The present invention will immediately, and automatically, upon failure of one of the pulverizers readjust the remaining pulverizers to fire at a rate sufficient to hold the pressure. Such automatic readjustment actually anticipates a change in the vapor pressure caused by the loss of one of the pulverizers. In essence, this novel control system senses what will happen in a vapor generator when a pulverizer fails to deliver fuel, and then adjusts the remaining pulverizers so that the condition is maintained in relation to the rate of fuel firing.

These and other objects will be apparent from the following description and drawings in which.

Figures 1, 2:
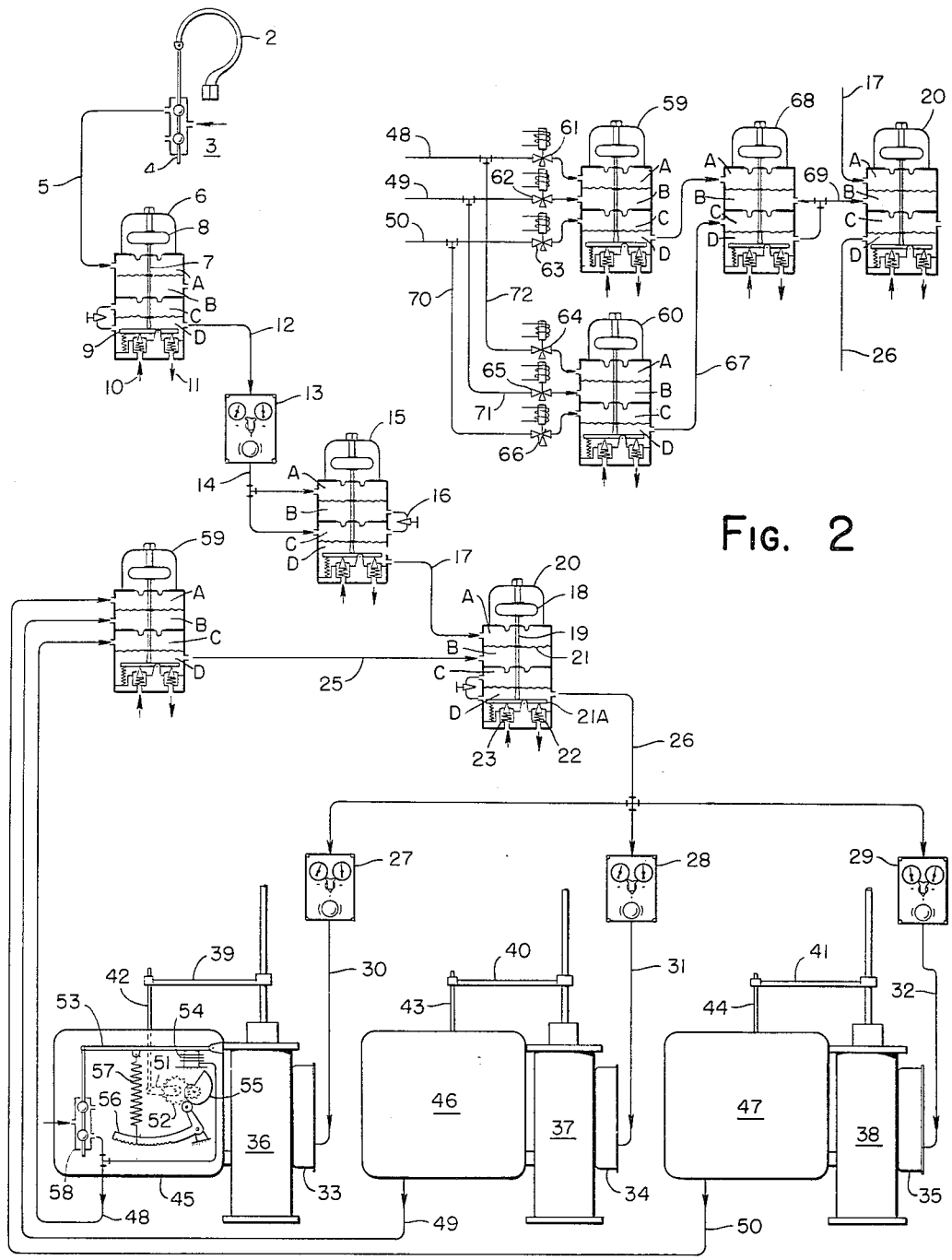
Fig. 1 is a diagrammatic representation of a control system embodying my invention.
Fig. 2 is a diagrammatic representation of a fragment of Fig. 1 with some modification.

I have chosen to illustrate and describe, as a preferred embodiment of my invention, a pneumatic combustion control system of a vapor generator fired by three pulverizers. Only the fuel feed control system, as actuated by vapor pressure, is shown in Fig. 1. The three control drives 36, 37, 38 with positioners 33, 34, 35, 45, 46, 47 which control three pulverizers, are diagrammatically shown and are as described in a copending application Serial No. 47,516, filed September 2, 1948, now Patent No. 2,679,829, by Gorrie et al. One of the positioners (45) is set out in more detail to show its function in the control system, but they are the same in construction.

In Fig. 1, a pressure responsive device, such as a Bourdon tube 2, is subjected to the pressure of the vapor discharged from the vapor generator (not shown), and operates to position a pilot valve 3, which may be of the type claimed in patent to Johnson 2,054,464, dated September 15, 1936, and, wherein axial movement of a pilot stem 4 in a pilot casing results in a pressure gradient at the outlet of the pilot casing in desired value relation to the said axial movement. For example, assuming a supply of air under pressure available at the pilot valve, then the pilot may be so shaped that a pressure gradient will be produced in the pipe 5, varying directly in value with the change of vapor pressure.

The pressure gradient from pilot valve 3 is communicated to relay 6 by pipe 5. Relay 6 may be of the type claimed in Patent Re. 21,804 to Gorrie, wherein the pressure fluid supplied by pipe 5 acts on a diaphragm through force of member 7 against a pivoted beam 9 for unseating a valve controlling a fluid supply connection 10. A spring 8 opposes the downward movement of member 7 so that an unseating of the supply valve 10 takes place only when the pressure delivered by conduit 5 overcomes the action of the spring. A valve controlling an exhaust connection 11 is adapted to be unseated by the beam 9 when the action of spring 8 overcomes a force exerted by the pressure fluid.

An unbalance of the relay by an increase in the pressure supplied to it results in a continuing increase in the pressure supplied to conduit 12. An unbalance in the opposite direction results in a continuing decrease in the pressure supplied to conduit 12. The connections to the pilot valve 3 are such that changes in the vapor pressure produce corresponding changes in the pressure supplied to conduit 5. When relay 6 is balanced the pressure in conduit 12 is held constant at the value existing when the balance is reached.

The pressure fluid supplied by conduit 12 passes through a selector valve 13 which provides for either manual or automatic control of the pressure fluid. The pressure fluid is then transmitted, through pipe 14, simultaneously to chambers A and C of relay 15. A throttling valve 16 is placed between chambers B and C to control the rate at which the pressure change in chamber B will equalize with the pressure in chamber C, then the outgoing loading pressure in pipe 17 from chamber D is made to follow the change in the loading pressure in chamber A plus the change in loading pressure in chamber C. When the pressure change occurs in chamber C, it will tend to equalize through the throttling valve 16 with the chamber B pressure, and, as these two pressures become equal, the magnification of the loading pressure change will be reduced to zero. Relay 15 will therefore produce twice the initial change in the outgoing loading pressure in pipe 17 from chamber D that occurs in chamber A, but, immediately, thereafter, as the pressures between chambers B and C equalize, the change in the outgoing loading pressure in pipe 17 will become equal to the change which occurred in a loading pressure in chamber A. Thus relay 15 is used for the purpose of immediately magnifying the fluid loading pressure changes, and demagnifying fluid loading pressure changes on a controlled time basis.

The fluid pressure in pipe 17 is communicated with chamber A of differential relay 20. The fluid pressure in pipe 25 from relay 50 is communicated with chamber B of relay 20. Chambers A and B of relay 20 are separated by a flexible diaphragm 21. Pressures established by relay 15 and by relay 59 are therefore effective on opposite sides of diaphragm 21. Axial movement of the member 19 is adapted to position a fulcrumed spring loaded member 21A for actuation of valves 22, 23. When the member 19 moves downwardly (on the drawing) valve 23 is open to admit air under pressure to chamber D, while when member 19 moves upwardly then valve 22 is open to bleed air from chamber D to the atmosphere. Thus axial movement of the member 19 from a predetermined neutral position will result in a variation in fluid pressure within chamber D. The magnitude of the pressure maintained in chamber D for a given differential between chambers A and B may be brought to any desired value by manually adjusting the effective force of spring 18.

In operation, upon an increase in loading pressure within chamber A of relay 20, member 19 will move downwardly allowing fluid pressure to enter chamber D until the increase in pressure in this chamber balances the increase in pressure in chamber A, when the movable member 19 will be restored to the neutral position. Conversely, upon an increase in fluid pressure in pipe 25 from chamber D of relay 59, the pressure within chamber B will increase, causing the movable member 19 to move upward and allow fluid pressure to exhaust from chamber D until the decrease in pressure resulting therefrom in chamber D is equal or proportional to the increase in pressure within the chamber B, when movable member 19 will return to the neutral position.

If the pressures within chambers A and B increase or decrease in unison, there will be no change in the force acting upon the movable member 19 and the pressure within chamber D will remain constant. The fluid pressure within the chamber D is therefore a measure of the differential in pressures existing within chambers A and B and as these pressures are proportional to the vapor pressure in Bourdon tube 2 and the fluid pressure in chamber D of relay 59, variations in pressure within the chamber D of relay 20, are inferentially a measure of the difference in vapor pressure in Bourdon tube 2 and fluid pressure in chamber D of relay 59 (the function of relay 59 will be discussed later).

The fluid pressure existing in chamber D of relay 20 is communicated simultaneously, through pipe 26, to selector valves 27, 28 and 29, these selector valves providing hand or automatic control. The fluid pressures from selector valves 27, 28 and 29 are communicated with positioners 33, 34, 35 on control drives 36, 37 and 38 through pipes 30, 31 and 32. The positioning of linkages 39, 40 and 41 are as described in the aforementioned application S. N. 47,516 by the coaction of positioners 33, 34, 35 and control drive units 36, 37, 38. Linkages 39, 40 and 41 are mechanically connected by links 42, 43, 44 to positioners 45, 46 and 47. These positioners 45, 46, 47 are known as position transmitters in that they transmit the position of linkages 39, 40, and 41, by the medium of fluid pressures, to a remote point (relay 59, in this case).

The fluid pressures from pipes 30, 31, 32 acting on control drive units 36, 37 and 38 position linkages 39, 40 and 41 which moves connecting arm 51 of positioner 45 (only the operation of positioner 45 will be discussed, but, inferentially, the same action is occurring at the same time to positioners 46 and 47 through impulses in pipes 31 and 32 respectively). It is enough to set out the action of the one positioner 45.

Linkage 42 acts through crank arm 51 to rotate gear 52 in one direction, as viewed in Fig. 1. This produces a turning of the cam 55 in a reverse direction to swing the bell crank 56 in a direction to change the tension of spring 57. As soon as the altered spring tension is transmitted to beam 53 against the pressure in bellows 54 the actuation of pilot valve 58 sends a fluid pressure representative of the position of linkage 39 to chamber C of relay 59. At the same time positioner 45 is operating so also are positioners 46 and 47 and they in turn communicate their fluid pressures through pipes 50 and 49 to chambers A and B respectively of relay 59.

Relay 59 is a totalizing relay in which the fluid pressures transmitted through pipes 48, 49 and 50 are added by the actions of the fluid pressure in chambers A, B and C. In order that these fluid pressures be added in relay 59 it is necessary that position transmitters 45, 46 and 47 have their ranges giving a loading pressure in pipes 48, 49 and 50 which will be additive in totalizing relay 59. For example, in Fig. 1 it will be necessary to adjust position transmitters 45 and 47 so that they transmit a fluid pressure in a range from 0 to 7 p. s. i., and in position transmitter 46 it will be necessary to adjust the fluid pressure output to fall within a range from 7 p. s. i. to 0. The reason being that a 7 to 0 range is necessary in actuating chamber B so that it operates in the same direction as chambers A and C making the total fluid pressure output from position transmitters 45, 46 and 47 additive and their total pressure effective in chamber D of relay 59. This total fluid pressure in chamber D is transmitted through pipe 25 to chamber B of relay 20 as previously described.

If, during the operation of the vapor generator, one of the three pulverizers fails to function it is taken out of the system by disconnecting its control unit. If for example, the pulverizer being controlled by unit 38 should be made inoperative, by manually turning selector valve 29 to reduce the control unit to its minimum position, the fluid pressure in pipe 50 would no longer actively communicate with chamber A of totalizing relay 59, as the fluid pressure from positioner 47 would be atmospheric. With chamber A of relay 59 inactive, only fluid pressures from position transmitters 45 and 46 through pipes 48 and 49 would be active in chambers B and C. The total fluid pressure in chamber D would then be lessened by the amount that had been previously applied to chamber A and this new total in chamber D would be communicated through pipe 25 to chamber B of differential relay 20. The reduced fluid pressure in chamber B of relay 20 would offer less opposition to the fluid pressure in chamber A, and, as a result, the fluid pressure in chamber D of relay 20 would be increased, and this increased fluid pressure would be communicated through pipe 26 through selector valves 27 and 28, and said fluid pressure continuing to act through pipes 30 and 31 to positioners 33 and 34 of control drive units 36, 37. This increased fluid pressure would then reposition linkages 39 and 40 which would cause them to feed more fuel to the vapor generator increasing the vapor pressure and, at the same time, sending a new increased fluid pressure through pipes 48 and 49 to chambers B and C of relay 59. As the pressure increased, it would immediately be reflected in chamber A of differential relay 20, and, at the same time, the increased fluid pressure in chamber D of totalizing relay 59 would be transmitted through pipe 25 to chamber B of differential relay 20. This would then balance the fluid pressures resulting from the vapor pressure and the fluid pressures transmitted from positioners 45 and 46 so that the same pressure produced by the boiler would be maintained by two pulverizers that had been previously maintained by the three pulverizers.

In Fig. 2, a fragment of Fig. 1 is shown with the addition of relays 60 and 68, and solenoid valves 61—66 and pipes 48, 49, 50, 70, 71 and 72. The arrangement of the relays in Fig. 2 represents a refinement of the control system disclosed in Fig. 1.

If the control drive units, described in the above specification, control pulverizers (not shown) that each have two fuel feeders (not shown), the modification of the fuel feed control disclosed may be desired. Assuming, for example, there are three pulverizers with two feeders each, it might be desirable to operate all three pulverizers but only five of the fuel feeders. The following description indicates how a vapor pressure maintained by three pulverizers and six fuel feeders may be maintained automatically by the three pulverizers and five of the fuel feeders. One fuel feeder may become inoperative, yet the vapor pressure must be maintained by the remaining fuel feeders.

The fluid pressure gradient from pilot valve 3 is communicated as described previously to chamber A of differential relay 20, in accordance with the vapor pressure of the boiler. The fluid pressure in chamber A of relay 20 is opposed by the fluid pressure in chamber B from pipe 69.

Solenoid three-way valves 61—66 are electrically connected to each of the fuel feeders (not shown) in a conventional manner, so as to actuate the three-way valves to an "off" position (i. e. pipes 48—50, 70—72, closed and the respective relay chambers vented to atmosphere) when a fuel feeder fails. For example, if one of two fuel feeders of a pulverizer controlled by control drive 36 fails, solenoid 61, being electrically connected to the failing feeder, operates to close the section of pipe 48 communicated with chamber A of relay 59, and fluid pressure in A chamber is vented to atmosphere; whereas solenoid 64 connected to the operating feeder on the pulverizer remains static and allows the fluid pressure in pipe 48 to continue communication through pipe 72 to chamber A of totalizing relay 60. As both feeders on each of the remaining two pulverizers are operating, and are controlled by control drives 37 and 38, position transmitters 46, 47 transmit a fluid impulse in accordance with the position of the control drives through pipes 49, 50, and solenoids 62, 63, 65, 66 remain open, allowing the fluid pressure in lines 49, 50, 70 and 71 to communicate with B and C chambers of totalizing relays 59, 60 respectively. The fluid pressure in chamber A of relay 59 is atmospheric, as mentioned above, when the feeder fails, thus the total fluid pressure in the D chamber of relay 59 is reduced by the amount of fluid pressure exhausted from chamber A by the operation of the solenoid 61 three-way valve.

This total fluid presure in chamber D of relay 59 is communicated by pipe 25 to chamber A of halving relay 68. The fluid presure of chambers A, B, C of relay 60 are totaled in chamber D, and this total fluid pressure is communicated by pipe 67 to chamber C of having relay 68. The reduced fluid pressure in relay 68 is communicated by pipe 69 to the B chamber of the differential relay 20.

The fluid pressure in chamber B of relay 20 is less than it was prior to the closing of the solenoid 61, and, as such, the B chamber offers less opposition to the impulse in the A chamber and a larger air fluid pressure is made effective in chamber D. The fluid pressure in the D chamber of relay 20 is communicated by pipe 26 to selector valves 27, 28, 29, and the effect is as described in conjunction with Fig. 1 to reposition the control drives so that five fuel feeders are carrying the same load as was formerly carried by six fuel feeders.

Although I have chosen to describe only one form of my invention it is not meant to be restricted to this one particular embodiment but may be limited only by the scope of the appended claims.

What I claim as new, and desire to secure by Letters Patent of the United States, is:

1. A control system for the pulverized coal supply of a vapor generator having multiple pulverizers with plural feeders for each pulverizer including, a control drive mechanism for each pulverizer positioned by fluid pressure, means for each control drive having a fluid pressure established therein representative of the position of the control drive mechanism, a plurality of multi-chambered relays for adding the control drive position fluid pressures, a valve in the fluid pressure conduit to each relay chamber under the control of a feeder, a relay adding the outputs of the said multi-chamber relays and forming a single fluid pressure representative of the number of feeders in operation, and a balance relay for opposing the said single fluid pressure with a fluid pressure representative of demand upon the vapor generator and producing a control fluid pressure output which is equally applied to the control drive mechanisms to set the total pulverizer output until the demand of the vapor generator is satisfied.

2. In a control system, a plurality of regulators controlling an agent affecting a condition to be maintained, means for detecting the condition, transmitting means to communicate an impulse proportional to the condition to the said regulators, a plurality of solenoid three-way valves in a plurality of pipes for communicating fluid pressures through a series of relays, said relays so connected as to sense the fluid pressure so applied that upon closure of a solenoid through electric means upon failure of one of the regulators the remaining pressures are additive to an amount less than the amount of the fluid pressure discharged to the atmosphere through the three-way valve by the action of the solenoid, said reduction of additive amount of fluid pressure affording less resistance to the fluid pressure impulse proportional to the condition, thereby allowing a stronger impulse from the condition to enter the regulators whereby the condition is maintained at the same value in spite of the failure of one of the regulators.

3. A control system for the fuel supply to a vapor generator having a plurality of separate fuel supply means, a regulator for each of said means, a device for each regulator establishing a fluid loading pressure continuously representative of regulator position, a conduit for each such loading pressure, multi-chambered fluid pressure relay means to which the conduits communicate one to a chamber, the several chambers acting to algebraically add the several fluid loading pressures and to produce a resultant control pressure, a three-way valve in each conduit, each valve in a first position establishing communication between the conduit and its related chamber and in its alternate position closing-off communication of the conduit with the chamber and simultaneously bleeding the chamber to the atmosphere, an electric solenoid actuator for each valve, whereby, when all valves are in the said first position the said resultant control pressure is representative of the average of the positions of all of the regulators and alternatively when at least one of the three-way valves is in its alternate position then the resultant control pressure is representative of the average of less than all of the regulator positions by the number of regulators individually taken out of communication with the multi-chambered relay.

4. The control system of claim 3 including transmitting means establishing a fluid pressure impulse representative of demand upon the vapor generator, a balance relay for opposing the said demand fluid pressure with the said resultant control pressure and producing an output fluid pressure equally distributed in effect upon all of said regulators.

References Cited in the file of this patent

UNITED STATES PATENTS

| | | |
|---|---|---|
| 1,725,202 | Lockett | Aug. 20, 1929 |
| 1,851,974 | Bristol | Apr. 5, 1932 |
| 2,044,461 | Beck | June 16, 1936 |